United States Patent
Sun et al.

(10) Patent No.: US 11,071,138 B2
(45) Date of Patent: Jul. 20, 2021

(54) OTA DYNAMIC TDD WITH CUI-R MULTIPLEXED IN UL

(71) Applicant: QUALCOMM Incorporated, San Diego, CA (US)

(72) Inventors: Jing Sun, San Diego, CA (US); Xiaoxia Zhang, San Diego, CA (US); Kapil Bhattad, Bangalore (IN); Ananta Narayanan Thyagarajan, Bangalore (IN); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/281,429

(22) Filed: Feb. 21, 2019

(65) Prior Publication Data

US 2019/0268933 A1 Aug. 29, 2019

(30) Foreign Application Priority Data

Feb. 23, 2018 (IN) .............................. 201841006936

(51) Int. Cl.
*H04W 72/14* (2009.01)
*H04L 5/14* (2006.01)
(Continued)

(52) U.S. Cl.
CPC .......... *H04W 72/14* (2013.01); *H04L 5/0048* (2013.01); *H04L 5/14* (2013.01); *H04W 72/0446* (2013.01);
(Continued)

(58) Field of Classification Search
None
See application file for complete search history.

(56) References Cited

U.S. PATENT DOCUMENTS

2017/0303220 A1* 10/2017 Sadeghi ................ H04L 5/0053
2019/0149269 A1* 5/2019 Chatterjee ............ H04L 5/0053
370/329

FOREIGN PATENT DOCUMENTS

WO WO-2017115191 A1 7/2017

OTHER PUBLICATIONS

International Search Report and Written Opinion—PCT/US2019/019100—ISA/EPO—dated Jun. 24, 2019 (182113WO).
(Continued)

*Primary Examiner* — Diane L Lo
(74) *Attorney, Agent, or Firm* — QUALCOMM Incorporated

(57) ABSTRACT

Over-the-air (OTA) dynamic time division duplex (TDD) is disclosed with a channel use indicator (CUI) receiver (CUI-R) signal multiplexed in uplink transmissions. According to various aspects, a user equipment (UE) may receive a downlink grant from a serving base station, in which the downlink grant identifies downlink transmissions in one or more subsequent communication slots. The UE may identify a trigger for transmission of a channel usage signal associated with the grant that may be received by neighboring UEs that may potentially interfere. The UE transmits the channel usage signal in a next scheduled uplink region and then receives downlink data from the serving base station according to the downlink grant. If the neighboring UE receives a conditional uplink grant, then it may proceed with uplink transmissions when it fails to detect the channel usage signal from the UE.

56 Claims, 11 Drawing Sheets

(51) Int. Cl.
*H04W 72/04* (2009.01)
*H04L 5/00* (2006.01)
*H04W 72/12* (2009.01)
*H04W 74/08* (2009.01)

(52) U.S. Cl.
CPC ... *H04W 72/1226* (2013.01); *H04W 72/1289* (2013.01); *H04W 74/0816* (2013.01)

(56) References Cited

OTHER PUBLICATIONS

Partial International Search Report—PCT/US2019/019100—ISA/EPO—dated Apr. 29, 2019 (182113WO).
Qualcomm Incorporated: Potential Solutions and Techniques for NR Unlicensed, 3GPP Draft; R1-1802865, 7.6.4 Potential Solutions and Techniques for NR Unlicensed, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), pp. 1-11, XP051398278, Retrieved from the Internet: URL: http://www.3gpp.org/ftp/tsg_ran/WG1_RL1/TSGR1_92/Docs/ [retrieved on Feb. 17, 2018], p. 7, p. 5, Proposal 6.
Qualcomm Incorporated: "TxOP Frame Structure for NR Unlicensed", 3GPP Draft; R1-1802866, 7.6.5 Frame Structure for NR Unlicensed, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), pp. 1-5, XP051398279, Retrieved from the Internet: URL: http://www.3gpp.org/ftp/tsg_ran/WG1_RL1/TSGR1_92/Docs/ [retrieved on Feb. 17, 2018], Section 3.1 Channel usage indication, Figure 3, p. 3; 3.2 CSI determination, Proposal 2, p. 4; Figure 6, p. 4; 4.Data transmission stage.
Qualcomm MTK Huawei Hisilicon ZTE ZTE: "WF on L1 Broadcast Control Channel," 3GPP Draft; R1-1613737 WF on L1 Broadcast Control Channel, 3rd Generation Partnership Project (3GPP), Mobile Competence Centre; 650, Route Des Lucioles; F-06921 Sophia-Antipolis Cedex; France, vol. RAN WG, No. Reno, USA; Nov. 14, 2016-Nov. 18, 2016, Nov. 19, 2016, XP051191554, 3 pages, Retrieved from the Internet: URL: http://www..3gpp.org/ftp/tsg_ran/WG1_RL1/TSGR1_87/Docs/ [retrieved on Nov. 19, 2016] p. 2-p. 3.

* cited by examiner

OTA DYNAMIC TDD WITH CUI-R MULTIPLEXED IN UL

CROSS-REFERENCE TO RELATED APPLICATIONS

This application claims the benefit of India Provisional Patent Application No. 201841006936, entitled, "OTA DYNAMIC TDD WITH CUI-R MULTIPLEXED IN UL," filed on Feb. 23, 2018, which is expressly incorporated by reference herein in its entirety.

BACKGROUND

Field

Aspects of the present disclosure relate generally to wireless communication systems, and more particularly, to dynamic time division duplex (TDD) based wireless communication systems, with channel use indicator (CUI) receive (CUI-R) multiplexed in uplink transmissions, used as over the air (OTA) signaling for UE to UE interference management.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a UE, a downlink grant from a serving base station, wherein the downlink grant identifies downlink transmission in one or more subsequent communication slots, identifying, by the UE, a trigger for transmission of a channel usage signal associated with the downlink grant, transmitting, by the UE, the channel usage signal in a next scheduled uplink region, and receiving, by the UE, downlink data from the serving base station according to the downlink grant, wherein the channel usage signal is transmitted between the receiving the downlink grant and the receiving the downlink data.

In an additional aspect of the disclosure, a method of wireless communication includes receiving, at a UE, a conditional uplink grant, wherein the conditional uplink grant identifies uplink transmissions for one or more subsequent uplink slots, identifying, by the UE, a monitor configuration for detection of a channel usage signal from one or more neighboring UEs, monitoring, by the UE in response to the monitor configuration, for the channel usage signal in a next scheduled uplink region, transmitting, by the UE, uplink data according to the conditional uplink grant in response to a failure to detect the channel usage signal, and refraining, by the UE, from transmission of the uplink data according to the conditional uplink grant in response to detection of the channel usage signal.

In an additional aspect of the disclosure, a method of wireless communication includes receiving, at a UE, a downlink grant from a serving base station, wherein the downlink grant identifies downlink transmission in one or more subsequent communication slots, receiving, by the UE, a trigger in a control signal separate from the downlink grant, identifying, by the UE, a trigger for transmission of a channel usage signal associated with the downlink grant, transmitting, by the UE, the channel usage signal in a next scheduled uplink region, wherein the next scheduled uplink region is prior to the downlink grant, and receiving, by the UE, downlink data from the serving base station according to the downlink grant, wherein the channel usage signal is transmitted between the receiving the downlink grant and the receiving the downlink data.

In an additional aspect of the disclosure, a method of wireless communication includes communicating, at a base station, a slot format to one or more neighboring base stations, wherein the slot format identifies configuration of communications between the base station and one or more served UEs, triggering, by the base station, a channel usage signal from the one or more served UEs in response to one of: a downlink-determined communication slot of a flexible-direction slot, or an uplink-determined communication of the one or more neighboring base stations of another flexible-direction slot, and transmitting, by the base station, downlink data to the one or more served UEs at the downlink-determined communication slot.

In an additional aspect of the disclosure, a method of wireless communication includes communicating, at a base station, a slot format to one or more neighboring base stations, wherein the slot format identifies configuration of communication slots between the base station and one or more served UEs, receiving, at the base station, a neighboring slot format from the one or more neighboring base stations, wherein the neighboring slot format identifies configuration of communication slots between the one or more neighboring base stations and one or more neighboring UEs, signaling, by the base station, the one or more served UEs to monitor for a channel usage signal from the one or more neighboring UEs during one of: an uplink-determined communication slot of a flexible-direction slot, or a downlink-determined communication slot of the one or more neighboring base stations of another flexible-direction slot, and receiving, by the base station, uplink transmissions from the one or more served UEs based on a conditional uplink grant from the base station conditioned upon failure to detect the channel usage signal.

In an additional aspect of the disclosure, an apparatus configured for wireless communication includes means for receiving, at a UE, a downlink grant from a serving base station, wherein the downlink grant identifies downlink transmission in one or more subsequent communication slots, means for identifying, by the UE, a trigger for transmission of a channel usage signal associated with the downlink grant, means for transmitting, by the UE, the channel usage signal in a next scheduled uplink region, and means for receiving, by the UE, downlink data from the serving base station according to the downlink grant, wherein the channel usage signal is transmitted between the receiving the downlink grant and the receiving the downlink data.

In an additional aspect of the disclosure, an apparatus configured for wireless communication includes means for receiving, at a UE, a conditional uplink grant, wherein the conditional uplink grant identifies uplink transmissions for one or more subsequent uplink slots, means for identifying, by the UE, a monitor configuration for detection of a channel usage signal from one or more neighboring UEs, means for monitoring, by the UE in response to the monitor configuration, for the channel usage signal in a next scheduled uplink region, means for transmitting, by the UE, uplink data according to the conditional uplink grant in response to a failure to detect the channel usage signal, and means for refraining, by the UE, from transmission of the uplink data according to the conditional uplink grant in response to detection of the channel usage signal.

In an additional aspect of the disclosure, an apparatus configured for wireless communication includes means for receiving, at a UE, a downlink grant from a serving base station, wherein the downlink grant identifies downlink transmission in one or more subsequent communication slots, means for receiving, by the UE, a trigger in a control signal separate from the downlink grant, means for identifying, by the UE, a trigger for transmission of a channel usage signal associated with the downlink grant, means for transmitting, by the UE, the channel usage signal in a next scheduled uplink region, wherein the next scheduled uplink region is prior to the downlink grant, and means for receiving, by the UE, downlink data from the serving base station according to the downlink grant, wherein the channel usage signal is transmitted between execution of the means for receiving the downlink grant and the means for receiving the downlink data.

In an additional aspect of the disclosure, an apparatus configured for wireless communication includes means for communicating, at a base station, a slot format to one or more neighboring base stations, wherein the slot format identifies configuration of communications between the base station and one or more served UEs, means for triggering, by the base station, a channel usage signal from the one or more served UEs in response to one of: a downlink-determined communication slot of a flexible-direction slot, or an uplink-determined communication of the one or more neighboring base stations of another flexible-direction slot, and means for transmitting, by the base station, downlink data to the one or more served UEs at the downlink-determined communication slot.

In an additional aspect of the disclosure, an apparatus configured for wireless communication includes means for communicating, at a base station, a slot format to one or more neighboring base stations, wherein the slot format identifies configuration of communication slots between the base station and one or more served UEs, means for receiving, at the base station, a neighboring slot format from the one or more neighboring base stations, wherein the neighboring slot format identifies configuration of communication slots between the one or more neighboring base stations and one or more neighboring UEs, means for signaling, by the base station, the one or more served UEs to monitor for a channel usage signal from the one or more neighboring UEs during one of: an uplink-determined communication slot of a flexible-direction slot, or a downlink-determined communication slot of the one or more neighboring base stations of another flexible-direction slot, and means for receiving, by the base station, uplink transmissions from the one or more served UEs based on a conditional uplink grant from the base station conditioned upon failure to detect the channel usage signal.

In an additional aspect of the disclosure, a non-transitory computer-readable medium having program code recorded thereon. The program code further includes code to receive, at a UE, a downlink grant from a serving base station, wherein the downlink grant identifies downlink transmission in one or more subsequent communication slots, code to identify, by the UE, a trigger for transmission of a channel usage signal associated with the downlink grant, code to transmit, by the UE, the channel usage signal in a next scheduled uplink region, and code to receive, by the UE, downlink data from the serving base station according to the downlink grant, wherein the channel usage signal is transmitted between the receiving the downlink grant and the receiving the downlink data.

In an additional aspect of the disclosure, a non-transitory computer-readable medium having program code recorded thereon. The program code further includes code to receive, at a UE, a conditional uplink grant, wherein the conditional uplink grant identifies uplink transmissions for one or more subsequent uplink slots, code to identify, by the UE, a monitor configuration for detection of a channel usage signal from one or more neighboring UEs, code to monitor, by the UE in response to the monitor configuration, for the channel usage signal in a next scheduled uplink region, code to transmit, by the UE, uplink data according to the conditional uplink grant in response to a failure to detect the channel usage signal, and code to refrain, by the UE, from transmission of the uplink data according to the conditional uplink grant in response to detection of the channel usage signal.

In an additional aspect of the disclosure, a non-transitory computer-readable medium having program code recorded thereon. The program code further includes code to receive, at a UE, a downlink grant from a serving base station, wherein the downlink grant identifies downlink transmission in one or more subsequent communication slots, code to receive, by the UE, a trigger in a control signal separate from the downlink grant, code to identify, by the UE, a trigger for transmission of a channel usage signal associated with the downlink grant, code to transmit, by the UE, the channel usage signal in a next scheduled uplink region, wherein the next scheduled uplink region is prior to the downlink grant, and code to receive, by the UE, downlink data from the serving base station according to the downlink grant, wherein the channel usage signal is transmitted between execution of the code to receive the downlink grant and the code to receive the downlink data.

In an additional aspect of the disclosure, a non-transitory computer-readable medium having program code recorded thereon. The program code further includes code to communicate, at a base station, a slot format to one or more neighboring base stations, wherein the slot format identifies configuration of communications between the base station and one or more served UEs, code to trigger, by the base station, a channel usage signal from the one or more served UEs in response to one of: a downlink-determined communication slot of a flexible-direction slot, or an uplink-determined communication of the one or more neighboring base stations of another flexible-direction slot, and code to transmit, by the base station, downlink data to the one or more served UEs at the downlink-determined communication slot.

In an additional aspect of the disclosure, a non-transitory computer-readable medium having program code recorded thereon. The program code further includes code to communicate, at a base station, a slot format to one or more neighboring base stations, wherein the slot format identifies configuration of communication slots between the base station and one or more served UEs, code to receive, at the base station, a neighboring slot format from the one or more neighboring base stations, wherein the neighboring slot format identifies configuration of communication slots between the one or more neighboring base stations and one or more neighboring UEs, code to signal, by the base station, the one or more served UEs to monitor for a channel usage signal from the one or more neighboring UEs during one of: an uplink-determined communication slot of a flexible-direction slot, or a downlink-determined communication slot of the one or more neighboring base stations of another flexible-direction slot, and code to receive, by the base station, uplink transmissions from the one or more served UEs based on a conditional uplink grant from the base station conditioned upon failure to detect the channel usage signal.

In an additional aspect of the disclosure, an apparatus configured for wireless communication is disclosed. The apparatus includes at least one processor, and a memory coupled to the processor. The processor is configured to receive, at a UE, a downlink grant from a serving base station, wherein the downlink grant identifies downlink transmission in one or more subsequent communication slots, to identify, by the UE, a trigger for transmission of a channel usage signal associated with the downlink grant, to transmit, by the UE, the channel usage signal in a next scheduled uplink region, and to receive, by the UE, downlink data from the serving base station according to the downlink grant, wherein the channel usage signal is transmitted between the receiving the downlink grant and the receiving the downlink data.

In an additional aspect of the disclosure, an apparatus configured for wireless communication is disclosed. The apparatus includes at least one processor, and a memory coupled to the processor. The processor is configured to receive, at a UE, a conditional uplink grant, wherein the conditional uplink grant identifies uplink transmissions for one or more subsequent uplink slots, to identify, by the UE, a monitor configuration for detection of a channel usage signal from one or more neighboring UEs, to monitor, by the UE in response to the monitor configuration, for the channel usage signal in a next scheduled uplink region, to transmit, by the UE, uplink data according to the conditional uplink grant in response to a failure to detect the channel usage signal, and to refrain, by the UE, from transmission of the uplink data according to the conditional uplink grant in response to detection of the channel usage signal.

In an additional aspect of the disclosure, an apparatus configured for wireless communication is disclosed. The apparatus includes at least one processor, and a memory coupled to the processor. The processor is configured to receive, at a UE, a downlink grant from a serving base station, wherein the downlink grant identifies downlink transmission in one or more subsequent communication slots, to receive, by the UE, a trigger in a control signal separate from the downlink grant, to identify, by the UE, a trigger for transmission of a channel usage signal associated with the downlink grant, to transmit, by the UE, the channel usage signal in a next scheduled uplink region, wherein the next scheduled uplink region is prior to the downlink grant, and to receive, by the UE, downlink data from the serving base station according to the downlink grant, wherein the channel usage signal is transmitted between execution of the configuration to receive the downlink grant and the configuration to receive the downlink data.

In an additional aspect of the disclosure, an apparatus configured for wireless communication is disclosed. The apparatus includes at least one processor, and a memory coupled to the processor. The processor is configured to communicate, at a base station, a slot format to one or more neighboring base stations, wherein the slot format identifies configuration of communications between the base station and one or more served UEs, to trigger, by the base station, a channel usage signal from the one or more served UEs in response to one of: a downlink-determined communication slot of a flexible-direction slot, or an uplink-determined communication of the one or more neighboring base stations of another flexible-direction slot, and to transmit, by the base station, downlink data to the one or more served UEs at the downlink-determined communication slot.

In an additional aspect of the disclosure, an apparatus configured for wireless communication is disclosed. The apparatus includes at least one processor, and a memory coupled to the processor. The processor is configured to communicate, at a base station, a slot format to one or more neighboring base stations, wherein the slot format identifies configuration of communication slots between the base station and one or more served UEs, to receive, at the base station, a neighboring slot format from the one or more neighboring base stations, wherein the neighboring slot format identifies configuration of communication slots between the one or more neighboring base stations and one or more neighboring UEs, to signal, by the base station, the one or more served UEs to monitor for a channel usage signal from the one or more neighboring UEs during one of: an uplink-determined communication slot of a flexible-direction slot, or a downlink-determined communication slot of the one or more neighboring base stations of another flexible-direction slot, and to receive, by the base station, uplink transmissions from the one or more served UEs based on a conditional uplink grant from the base station conditioned upon failure to detect the channel usage signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
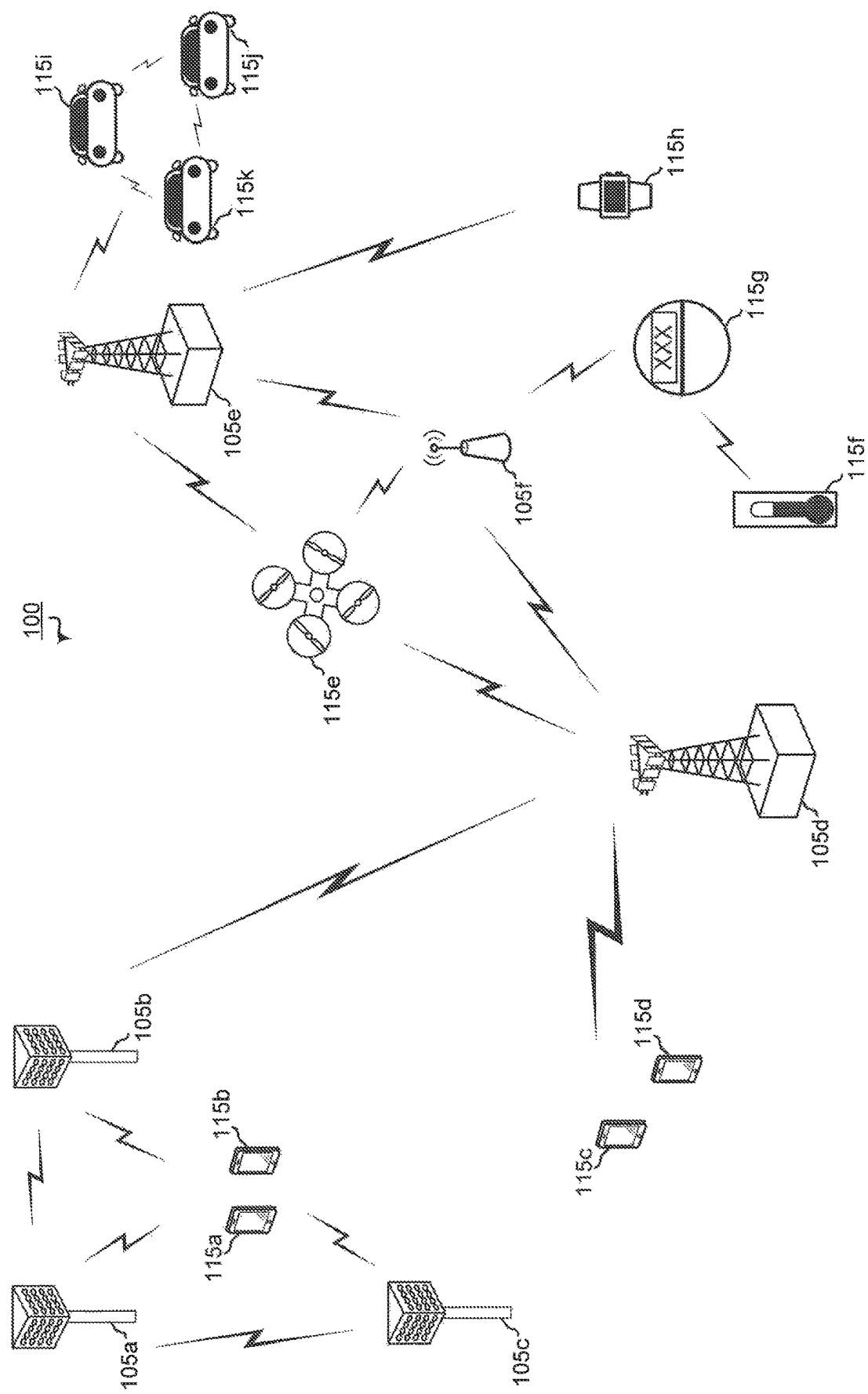
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
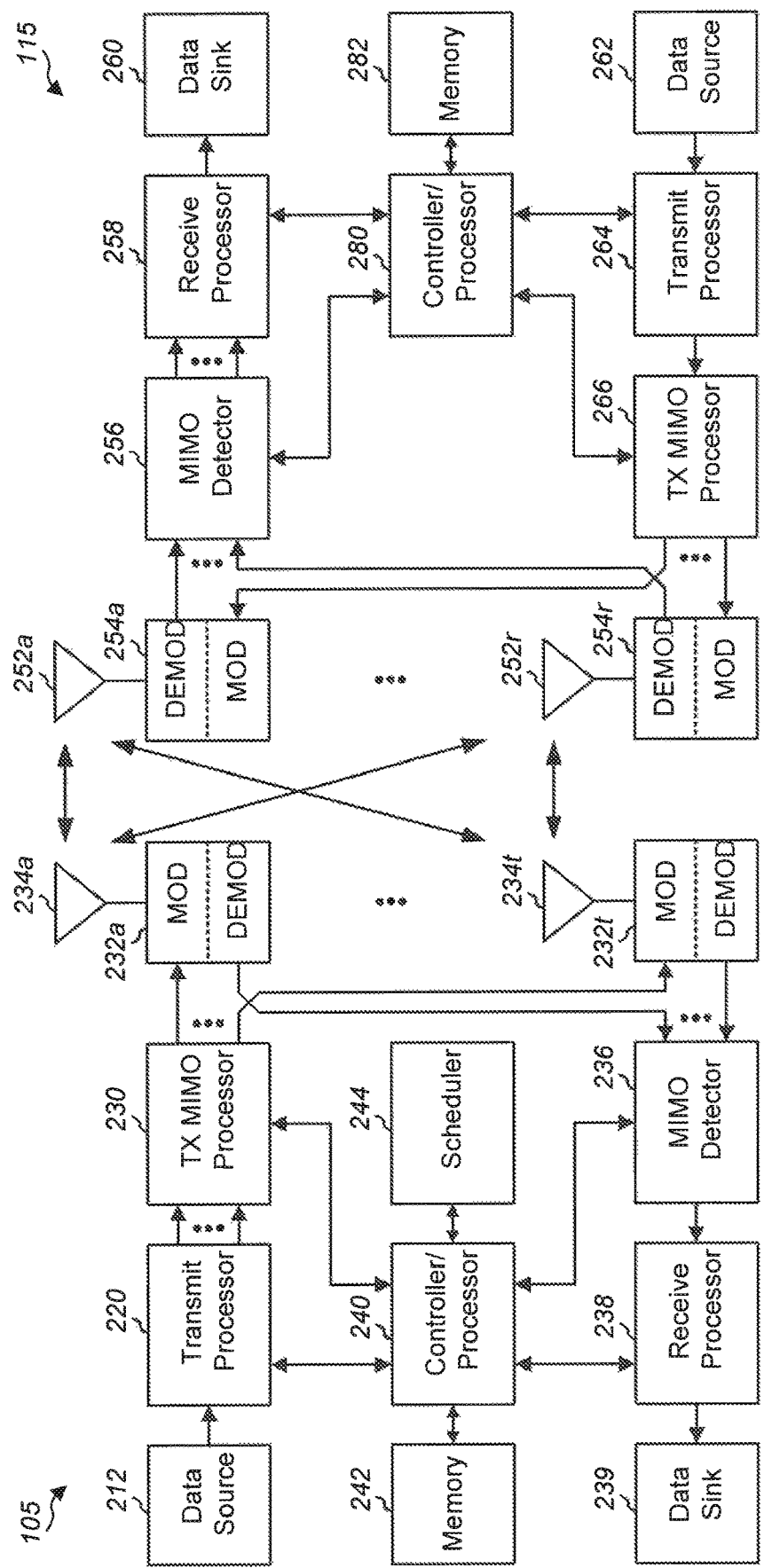
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5A, 5B, 8A, and 8B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
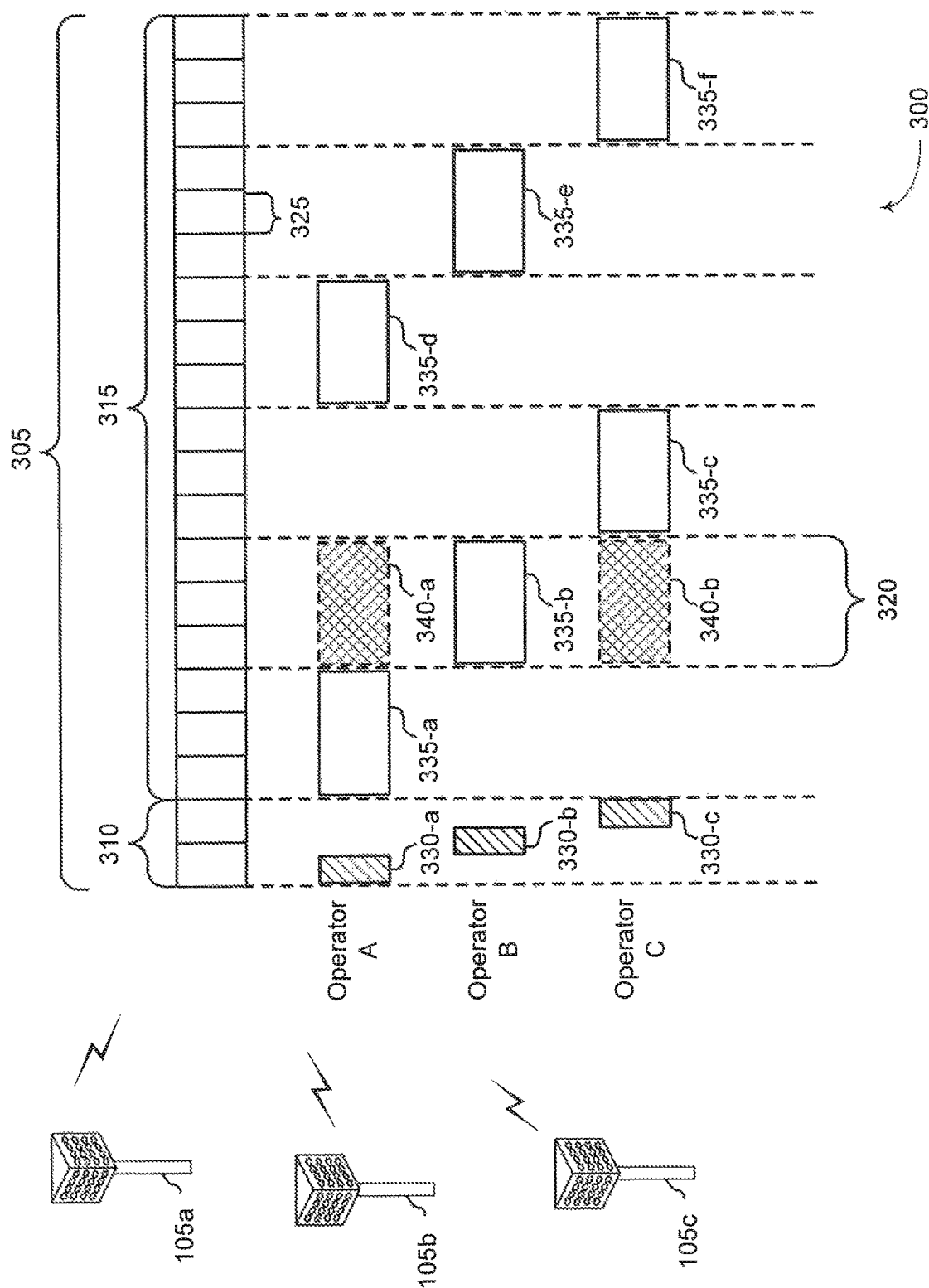
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
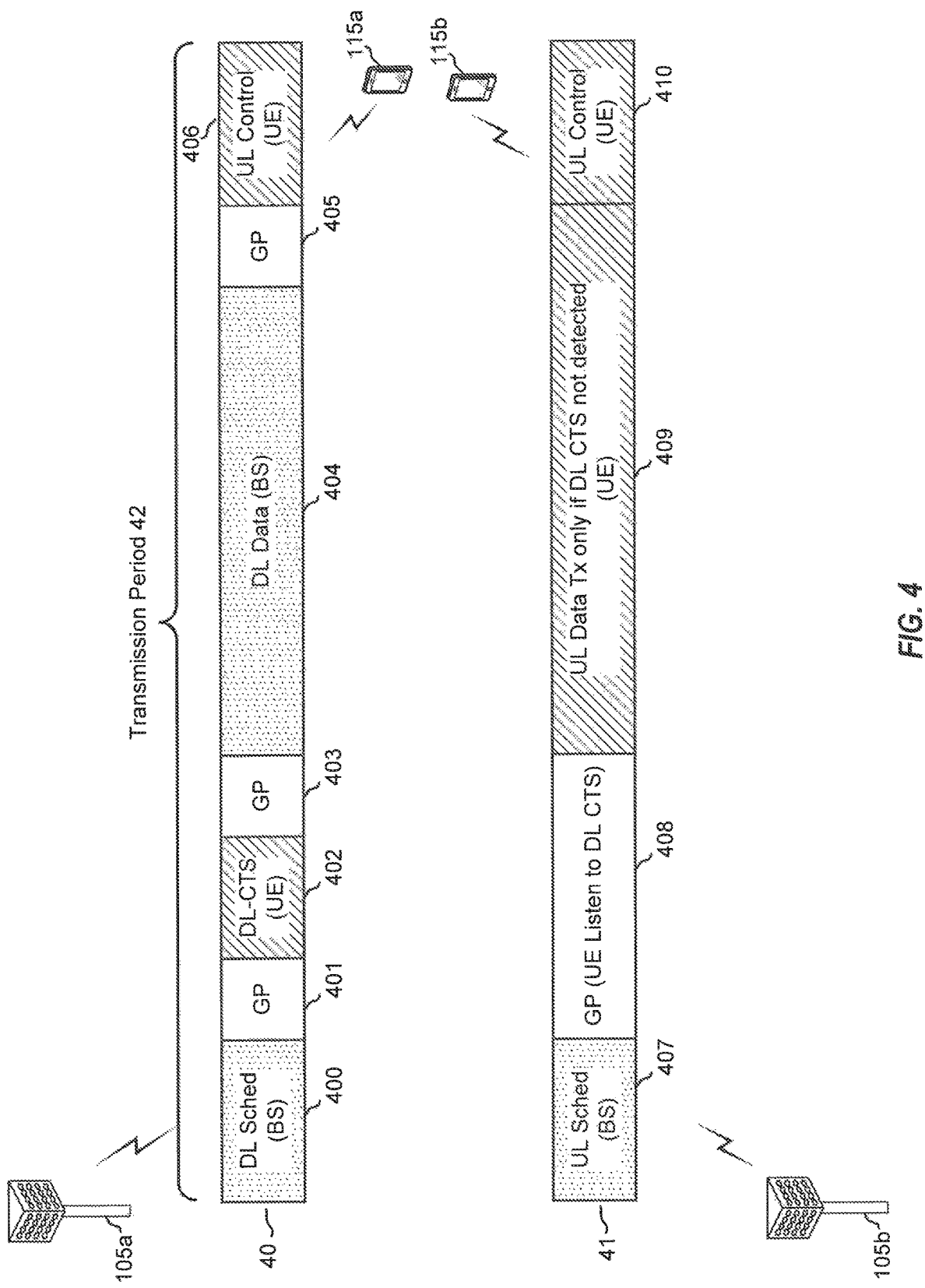
FIG. 4 is a block diagram illustrating example victim and aggressor links.

FIG. 4 is a block diagram illustrating communication links over a shared communication channel between a base station 105a and UE 115a and between a base station 105b and a UE 115b, wherein the communication links use dynamic time division duplex (TDD) to access the shared communication channel. For a given slot in dynamic TDD operations, a higher priority direction (e.g., downlink or uplink) is defined for a specified communication period. When either base station 105a or 105b desires to communicate via the lower priority direction, the higher priority direction base station will trigger over-the-air (OTA) signals to stop the lower priority direction base station if transmissions on the lower priority direction would cause strong interference at the receiver of the higher priority direction transmission.

For purposes of the example operation, the higher priority direction for transmission period 42 is downlink. Base station 105a has downlink data for UE 115a and intends to schedule downlink transmissions. Base station 105b is aware the UE 115b has uplink data for transmission and intends to schedule uplink transmissions for UE 115b. Because of the proximity of UEs 115a and 115b, the uplink transmissions from UE 115b may interfere with the receiving of the downlink transmissions by UE 115a. As such, the communication link between base station 105a and UE 115a may be referred to as victim link 40, while the communication link between base station 105b and UE 115b, which intends to schedule the lower priority direction communication, may be referred to as aggressor link 41.

In consideration of base station 105a intending to schedule downlink communications according to the higher priority direction, and base station 105b intending to schedule uplink communications according to the lower priority direction, signaling operations may proceed according to the dynamic TDD actions in order to avoid UE-to-UE interference during downlink transmissions. For victim link 40, base station 105a transmits downlink scheduling message 400 (e.g., PDCCH, DCI, etc.) at the beginning of transmission period 42. Base station 105a will then wait to receive a downlink clear-to-send (CTS) from UE 115a. The waiting and monitoring for the downlink CTS may create guard periods 401 and 403 around downlink CTS 402. Before transmitting downlink CTS 402, UE decodes downlink scheduling message 400 to obtain the downlink grant. If there is downlink data for UE 115a, it will then transmit downlink CTS 402. Upon detecting downlink CTS 402, base station 105a begins downlink data transmission 404 after guard period 403. Within the self-contained slot of transmission period 42, after downlink data transmission 404, another guard period 405 is placed for switching within transmission period 42 back to the uplink direction for uplink control message 406. The uplink control message 406 (acknowledgement (ACK), negative ACK (NACK), etc.) allows UE 115a to confirm either receipt of the downlink, failure to properly decode the downlink data, or other control information to base station 105a.

For aggressor link 41, base station 105b, having knowledge of uplink data that UE 115b desires to communicate, transmits uplink scheduling message 407 to UE 115b. Uplink scheduling message 407 (e.g., PDCCH, DCI, etc.) prompts UE 115b to monitor for a downlink CTS from a neighboring network node over a predetermined period 408. If UE 115b fails to detect a downlink CTS over predetermined period 408, then UE 115b may transmit uplink data transmission 409. UE 115b is only allowed to transmit uplink data transmission 409 when no downlink CTS is detected. If such downlink CTS is detected, UE 115b refrains from transmissions until uplink control message 410.

This dynamic TDD design requires the downlink CTS to be transmitted within the slot surrounded by guard periods, which results in high overhead. The CTS transmission itself provides additional formatting, as well as the guard periods used for the CTS transmission. Moreover, processing time for the UEs may not be realistic. For example, UE 115a is expected to decode downlink scheduling message 400 and trigger transmission of downlink CTS 402 within the time of guard period 401. Similarly, for UE 115b, UE 115b is expected to detect downlink CTS 402 and subsequently block uplink data transmission 409 within the time of guard period 403. At the same time, guard periods 401 and 403 cannot be too long, which would further increase the overhead, by reducing the effect time domain resources available for downlink or uplink transmissions (e.g., PDSCH or PUSCH transmissions).

The various aspects of the present disclosure are directed to providing a dynamic TDD operation with lower overhead by multiplexing a channel use indicator with already-scheduled uplink transmission regions. In such aspects, there is no dedicated CTS burst used requiring surrounding guard periods. For purposes of the different aspects, the downlink higher priority direction may be more interesting, as an uplink higher priority direction would involve base station-to-base station monitoring, which is less interesting in the licensed spectrum operations.

Figure 5A:
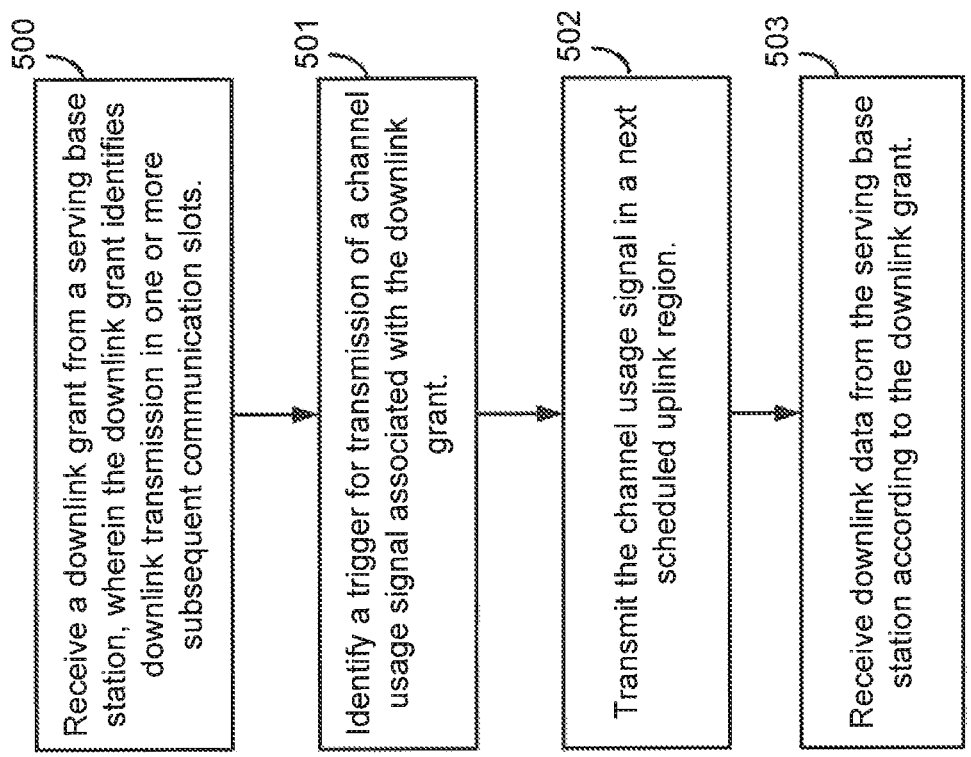
FIGS. 5A and 5B are block diagrams illustrating example blocks executed to implement one aspect of the present disclosure.
Figure 9:
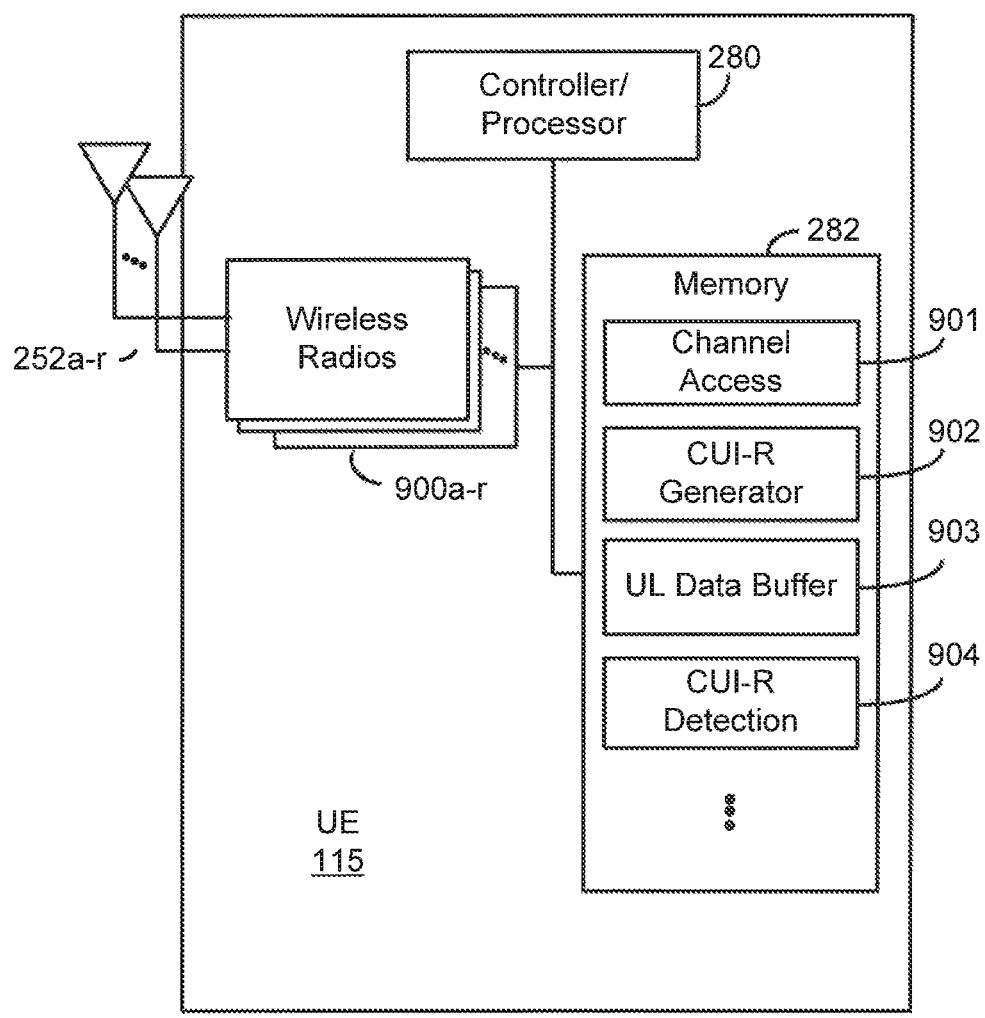
FIG. 9 is a block diagram illustrating an example UE configured according to aspects of the present disclosure.

FIG. 5A is a block diagram illustrating example blocks executed within the victim link to implement one aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266.

At 500, a UE receives a downlink grant from a serving base station, wherein the downlink grant identifies downlink transmission in one or more subsequent communication slots. When a serving victim base station has data for downlink to a victim UE, such as UE 115, a downlink grant, such as through PDCCH, DCI, or the like, may be received by UE 115 via antennas 252a-r and wireless radios 900a-r.

At 501, the UE identifies a trigger for transmission of a channel usage signal associated with the downlink grant. In a downlink higher priority direction, UE 115 receiving the downlink grant would transmit a channel usage signal, such as a CTS, identifying to neighboring nodes that it will be receiving downlink communications. UE 115, under control of controller/processor 280, executes channel access logic 901, stored in memory 282. The execution environment of channel access logic 901 prompts UE 115 to identifying a trigger for sending a channel usage indicator (CUI) receiver (CUI-R) signal via wireless radios 900*a-r* and antennas 252*a-r* for downlink transmissions. The channel usage signal according to the various aspects may be referred to as a CUI-R signal, instead of a CTS. The trigger for UE 115 to transmit the CUI-R may be included in the downlink grant or may be a separate signal from the serving base station to trigger CUI-R transmissions. Additionally, the transmission may be implicitly triggered simply by receiving the downlink grant.

At 502, the UE transmits a trigger for transmission of a channel usage signal associated with the downlink grant. After receiving and determining the trigger, UE 115, under control of controller/processor 280, would execute CUI-R generator logic 902, stored in memory 282.

The execution environment of CUI-R generator logic 902 would generate the CUI-R signal and provide for transmission by UE 115 via wireless radios 900*a-r* and antennas 252*a-r* according to the location or set of resources communicated by the serving base station. UE 115 would, thus, transmit the CUI-R at a next scheduled uplink transmission region. This next scheduled region may be the uplink control region scheduled at the end of a self-contained slot, or may be a next scheduled uplink slot or subframe within a transmission period.

At 503, the UE receives downlink data from the serving base station according to the downlink grant. After UE 115 transmits the CUI-R, it may receive the downlink data at the scheduled downlink time via antennas 252*a-r* and wireless radios 900*a-r*. For example, UE 115 may receive the downlink data in the downlink region of the next self-contained slot, or may receive the downlink data in a subsequent downlink slot or subframe as scheduled by the downlink grant.

Figure 5B:
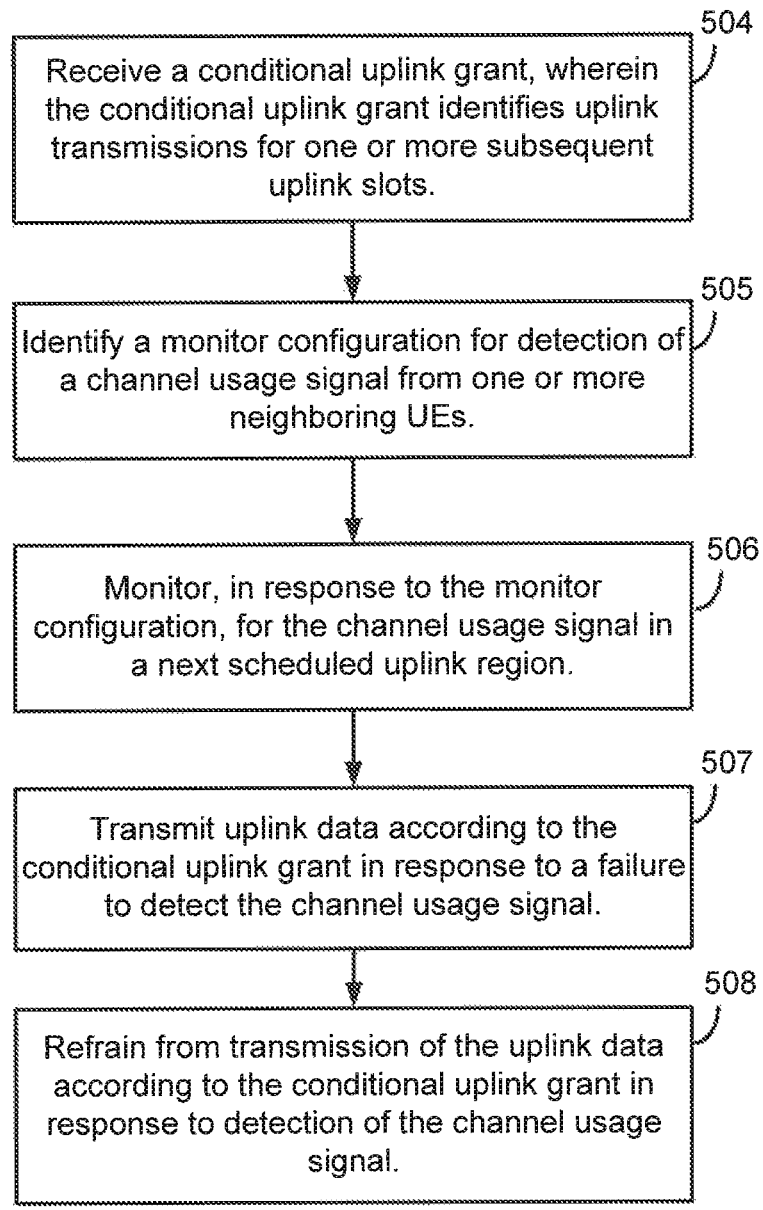

FIG. 5B is a block diagram illustrating example block executed within an aggressor link to implement one aspect of the present disclosure. The example blocks will also be described with respect to UE 115 as illustrated in FIG. 9. UE 115, as illustrated in FIG. 9 may be a victim UE or an aggressor UE depending on the priority direction of the transmission period and the direction of the data to be communicated between UE 115 and its serving base station.

At block 504, a UE receives a conditional uplink grant, wherein the conditional uplink grant identifies uplink transmissions for one or more subsequent uplink slots. As a base station is informed of uplink data available at a served UE, such as UE 115, for uplink transmissions in a downlink higher priority direction transmission period, the base station transmits a conditional uplink grant to UE 115. UE 115 would recognize data available in the uplink data buffer 903 and signal the serving base station for an uplink grant. UE 115 receives the uplink grant via antennas 252*a-r* and wireless radios 900*a-r*. The uplink grant (e.g., PDCCH, DCI, etc.) may identify one or more subsequent slots, subframes, or the like, for scheduling of the uplink transmissions. UE 115 receiving the conditional uplink grant, may implicitly identify that the uplink data slot scheduled by this grant is a downlink priority slot.

At block 505, the UE identifies a monitor configuration for detection of a channel usage signal from one or more neighboring UEs. In a downlink higher priority direction, UE 115 receiving a conditional uplink grant would execute CUI-R detection logic 904, stored in memory 282. The execution environment of CUI-R detection logic 904 allows UE 115 to begin monitoring for a CUI-R signal transmitted by one of its neighboring UEs. The trigger to prompt UE 115 to begin monitoring for such CUI-R may be included within the conditional uplink grant or may be a separate signal altogether from the serving base station. Additionally, the trigger may be implicit based on receipt of the conditional uplink grant. In case of the implicit trigger, the time for monitoring may be configured semi-statically.

At block 506, the UE monitors, in response to the monitor configuration, for the channel usage signal in a next scheduled uplink region. Once UE 115 identifies the monitoring trigger, UE 115, within the execution environment of CUI-R detection logic 904, monitors for the CUI-R in the next scheduled uplink region. As noted above, the next scheduled uplink region may be the scheduled uplink control region in a self-contained slot, or may be a subsequent scheduled uplink slot or subframe.

At block 507, the UE transmits uplink data according to the conditional uplink grant in response to a failure to detect the channel usage signal. When no CUI-R is detected during the next scheduled uplink region, UE 115 may transmit the uplink data transmissions from uplink data buffer 903 according to the conditional uplink grant. The uplink data transmissions are made by UE 115 using wireless radios 900*a-r* and antennas 252*a-r*.

At block 508, the UE refrains from transmission of the uplink data according to the conditional uplink grant in response to detection of the channel usage signal. When UE 115 detects a CUI-R during the next scheduled uplink region, the execution environment of channel access logic 901 causes UE 115 to block the scheduled uplink transmissions.

Figure 6:
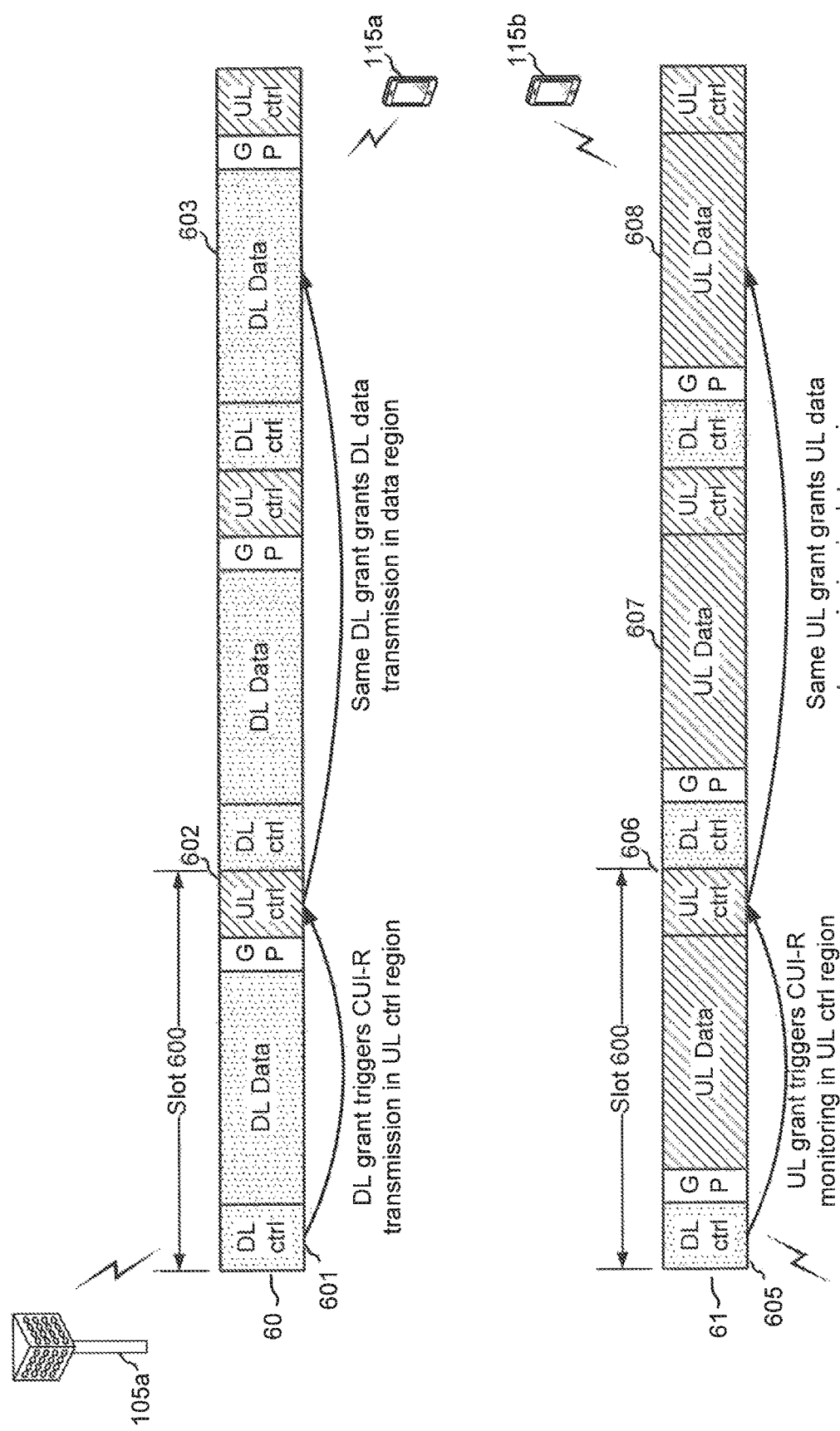
FIG. 6 is a block diagram illustrating a victim link and an aggressor link between base stations and UEs configured according to one aspect of the present disclosure.

FIG. 6 is a block diagram illustrating a victim link 60 and an aggressor link 61 between base stations and UEs configured according to one aspect of the present disclosure. From aggressor link perspective, the various aspects of the present disclosure provide for a "conditional" uplink grant, uplink grant in downlink control region 605, of aggressor link 61. This conditional uplink grant may also indicate a gating criterion for the uplink transmissions. The criterion is in the form of a signal detection between the uplink grant at downlink control region 601 and the scheduled uplink transmission at uplink data. For example, the uplink grant from base station 105*b* at downlink control region 601 signals UE 115*b* to monitor for the CUI-R during uplink control region 606 of slot 600. Uplink control region 606 corresponds to uplink control region 602 of slot 600 of the victim link 60 between base station 105*a* and UE 115*a*. When base station 105*a* has downlink data for UE 115*a*, a downlink grant in downlink control region 601 informs UE 115*a* to transmit CUI-R at the next scheduled uplink region, uplink control region 602. If a CUI-R is detected by UE 115*b*, it would skip uplink transmissions at least at uplink region 607 and possibly at both uplink regions 607 and 608. Otherwise, if no CUI-R is detected during uplink control region 606, then UE 115*b* may proceed with uplink transmissions according to the uplink grant at one or both of uplink regions 607 and 608.

From the perspective of victim link 60, the various aspects of the present disclosure provide for an additional CUI-R transmission in response to the downlink grant at downlink control region 601 and between the downlink grant and the scheduled downlink transmissions. The CUI-R waveform may share waveform formatting with either PUCCH or SRS.

In NR networks, typical UE capabilities may not include same slot PUSCH grant and transmission. Typically, a transmission timeline of N+1 or even N+2 may be used, where the uplink grant is signaled at time N. This typical NR timeline is beneficial for the various aspects of the present disclosure in which, on aggressor side (aggressor link 61), for the uplink grant in slot 600, the CUI-R will be monitored in uplink control region 606 at the end of slot 600.

Between downlink control regions 601 and 605 and uplink control regions 602 and 606, there should be enough symbols to support the downlink control signal (uplink grant) decoding and the CUI-R monitoring configuration. The same uplink grant that triggers UE 115b to monitor for CUI-R within slot 600 grants uplink transmissions in subsequent slots (e.g., slot N+1 or N+2, where N=slot 600). The preparation for uplink transmission can start when the uplink grant is received at downlink control region 605 but will be gated by detection of the CUI-R signal.

On the victim side (victim link 60), for the downlink grant at downlink control region 601 in slot 600, the CUI-R signal will be transmitted at the end of slot 600 in uplink control region 602. Again, between downlink control regions 601 and 605 and uplink control regions 602 and 606, there should be enough symbols to support the downlink control signal (downlink grant) decoding and the CUI-R transmission preparation. The same downlink grant received at downlink control region 601 of slot 600 grants downlink transmissions in subsequent slots (e.g., slot N+1 or N+2, where N=slot 600).

For the uplink grant received at downlink control region 605, the grant may include an indicator to trigger the CUI-R monitoring. The indicator may be a single bit to pre-configure UE 115b with detection on or off. Alternatively, the indicator may use multiple bits to pre-configure multiple choices of locations to monitor CUI-R. For the downlink grant received at downlink control region 601, a first alternative implementation of the grant identifies a single grant. The downlink grant may also carry a trigger for UE 115a to transmit the CUI-R transmission. In one example aspect, a single bit may be used to trigger a preconfigured CUI-R transmission according to a predetermined timeline. In alternative example aspects, multiple bits may be conveyed allowing UE 115a to select specific transmission resources from a set of preconfigured CUI-R resources for transmission.

In additional alternative example aspects, a separate grant may be transmitted by base station 105a that is a dedicated grant to trigger UE 115a for CUI-R transmission. This example aspect may be similar to a dedicated SRS trigger. In such case, the SRS can double as a channel measurement for the UE 115a as well. Moreover, base station 105a may transmit a further downlink grant to indicate the downlink transmission, possibly transmitted at a different time from the downlink grant transmitted at downlink control region 601.

In the various aspects of the present disclosure, the CUI-R signal may be configured using a waveform similar to an SRS waveform or a PUCCH waveform. For an SRS-type waveform, the CUI-R can be a subband-based SRS for subband-based interference management. This SRS-type waveform can possibly serve as a channel sensing SRS (aperiodic) as well at base station 105a. When configured as a PUCCH-type waveform (e.g., short PUCCH waveforms), the PUCCH-type CUI-R waveform may carry additional information (e.g., subband control in payload). For UE 115a in victim link 60, UE 115a may multiplex the CUI-R transmission with normal uplink transmissions. For example, UE 115a may time division multiplex (TDM) both control transmissions (e.g., PUCCH) and the CUI-R transmission. If the CUI-R signal is a SRS-type waveform, UE 115a may follow the existing SRS/PUCCH multiplexing design, while, if the CUI-R signal is a PUCCH-type waveform, UE 115a may follow the existing long/short PUCCH multiplexing with a short PUCCH design.

According to the various aspects of the present disclosure, the CUI-R transmitting UE may transmit either according to an SRS-type or PUCCH-type waveform. Because typical SRS transmission is designed for one symbol and used mainly for channel estimation, and typical PUCCH transmissions are designed to support different payload sizes, a CUI-R transmitting UE (e.g., UE 115a) may use an SRS-type waveform when the CUI-R is not required to carry any data and is used as a channel busy indicator, while a PUCCH-type waveform may be used to carry additional information about the UE identifier (ID) of UE 115a, so that the monitoring UE (e.g., UE 115b) can report which neighboring UE transmitted the detected CUI-R. With the SRS-type waveform, an indication can also be indirectly given depending on the frequency where detected, time where detected (for example different UEs transmit in different time), etc.

On the aggressor link UE side (aggressor link 61), UE 115b may switch to reception mode to detect CUI-R during uplink control region 606 when it is to transmit. In this case, UE 115b may not transmit the uplink signal, such as PUCCH. Base station 105b scheduling may be responsible to avoid scheduling UE 115b with uplink transmissions that conflict with CUI-R monitoring at uplink control region 606. For semi-static configured uplink transmission of PUCCH or SRS during this uplink control region 606, dropping rules may be applied to prevent collisions between triggered monitoring for CUI-R and scheduled uplink transmissions. For example, CUI-R detection may have a higher priority than periodic uplink transmissions, such as PUCCH or SRS. Accordingly, the aggressor UE (UE 115b) can drop transmission of the uplink control signals and, instead, monitor for CUI-R signals during, for example, uplink control region 606.

The example aspect illustrated by FIG. 6 illustrates an implementation with respect to a self-contained slot structure. It should be noted that the various aspects of the present disclosure are not limited to only self-contained slot structures. The aspects of the present disclosure may be used with multiple different transmission structures. The conditional uplink grant indicates to the uplink-scheduled UE (e.g., UE 115b) a CUI-R signal to detect. The downlink-scheduled UE (e.g., UE 115a) may not need a fixed timing for transmission of the CUI-R signal with respect to the conditionally scheduled uplink transmission. Multiple locations for transmission of the CUI-R signal may be pre-configured and indicated by the conditional uplink grant. For any given slot, however, the CUI-R transmission by UE 115a and CUI-R detection by UE 115b should match. When there is a single CUI-R location, less coordination may be used. When there are multiple location choices for the CUI-R signal within a given slot, greater coordination may be implemented between base stations 105a and 105b, so that the downlink and uplink grants point to the same CUI-R location. Alternatively, the uplink grant may point to multiple CUI-R locations, in which uplink transmission is cancelled if the CUI-R signal is detected in any of the identified locations. Similarly, multiple CUI-R transmission locations can be configured, in which the downlink grant identifies the CUI-R transmission location to be used or provides a selection mechanism for UE 115a to select the location(s) at which CUI-R is to be transmitted.

Figure 7:
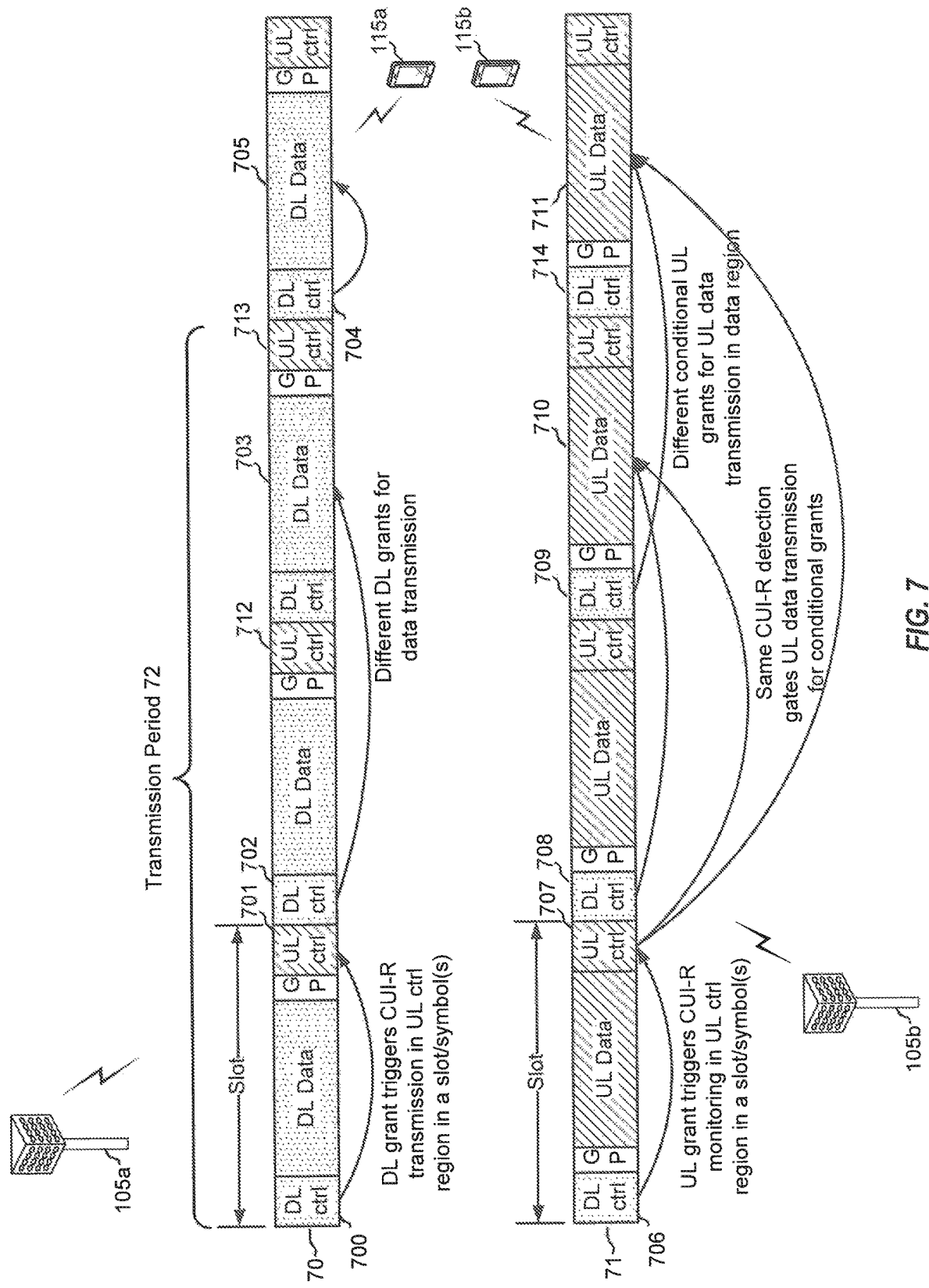
FIG. 7 is a block diagram illustrating a victim link and an aggressor link with base stations and UEs configured according to aspects of the present disclosure.

FIG. 7 is a block diagram illustrating a victim link 70 and an aggressor link 71 with base stations and UEs configured according to aspects of the present disclosure. A single CUI-R transmission can indicate a channel usage for multiple downlink slots that are to come. Base station 105a has downlink data to send to UE 115a via victim link 70. At downlink control region 700 at the beginning of the slot, base station 105a transmits a downlink grant. The downlink grant triggers UE 115a to transmit a CUI-R signal at uplink control region 701 at the end of the slot. The CUI-R signal transmitted by UE 115a indicates channel usage for downlink data regions 703 and 705 in subsequent slots.

In additional aspects, base station 105a may semi-statically configure UE 115a for periodic CUI-R transmissions, which may be valid for a configured period. For example, the downlink grant transmitted at downlink control region 700 triggers UE 115a to begin transmitting CUI-R signals at each uplink control region, such as uplink control regions 701, 712, and 713 of victim link 70. An aggressor UE, such as UE 115b, when it detects the CUI-R signal, can use the detection to gate or suspend all uplink transmission slots for some valid period, if an uplink grant transmitted at downlink control region 706 of aggressor link 71 is conditional on no CUI-R detection. For example, once UE 115b detects the CUI-R signal at uplink control region 707, it suspends any uplink transmissions scheduled by the conditional grant received in downlink control region 706 until the end of transmission period 72. Again this transmission period 72 can be semi-statically or dynamically configured through a downlink control information signal. In such an example implementation, the uplink grant for data transmission can be transmitted at a much later time than the CUI-R slot, thus, decoupling the timeline for the grant from CUI-R detection. For example, UE 115b may receive uplink grants at each of downlink control regions 706, 708, and 709 granting uplink transmissions at different subsequent slots. Thus, after transmission period 72, if no additional CUI-R is detected, the uplink grant received from base station 105b at downlink control region 709 may schedule uplink transmissions from UE 115b at uplink region 711, even though uplink grants for uplink data region 710 were gated by detection of CUI-R at uplink control region 707.

A victim side base station, such as base station 105a, which expects UE-UE interference in the downlink direction can configure UE 115a for CUI-R transmissions in specific symbols (e.g., uplink control symbols) of every slot or periodic slots. An aggressor side base station, such as base station 105b, which expects to grant uplink data transmission to UE 115b, may configure UE 115b dynamically or semi-statically to monitor for CUI-R signals on specific symbols on all slots or periodic slots or whenever possible. When UE 115b receives a conditional uplink grant from base station 105b, UE 115b can look back to the last slot it detected a CUI-R. For example, if UE 115b receives a conditional uplink grant at downlink control region 714, it may look back to determine that it last detected a CUI-R signal at uplink control region 707. If the duration since uplink control region 707 is less than a configured minimum duration, then UE 115b may use the previously-detected CUI-R to gate the uplink transmissions identified at downlink control region 714. Otherwise, if the duration is more than the configured minimum duration UE 115b can move forward with uplink transmissions according to the uplink grant.

The symbols for transmission of CUI-R in any slot of the victim link should match the symbols the aggressor UE uses to monitor for the CUI-R signals. A victim base station, such as base station 105a, can configure multiple UEs to transmit CUI-R in different slots and/or different frequency parts. The aggressor UE, such as UE 115b, that detects the CUI-R can report the slot/frequency information of where it detected the CUI-R, so that base station 105b and other neighboring base stations can identify potential interfering pairs of UEs.

With a semi-static level cooperation, a base station can inform neighbors on the semi-static downlink/uplink configuration. For example, in FIG. 7, base stations 105a and 105b may semi-statically exchange downlink/uplink configuration information concerning the next transmission periods, such as transmission period 72. In such aspect, base station 105a and 105b would only have concern for triggering transmission or monitoring for CUI-R signals in self-contained downlink slots, or flexible slots/subframes that can be selected as downlink regions, or for neighboring uplink regions in self-contained slots or flexible slots or subframes that may be determined for uplink transmissions by neighboring wireless nodes. For cases in which the neighboring network entities are part of the same network operator, it is likely that the same semi-static downlink/uplink configuration is applied.

According to the various aspects of the present disclosure, for a dynamic level cooperation, base stations 105a and 105b may inform each other the dynamic determination of downlink or uplink for different transmissions regions, flexible slots or subframes, on DL/UL for slots in the future. A victim base station, such as base station 105a, may trigger CUI-R transmission from UE 115a for self-contained downlink slots and neighboring uplink slots. An aggressor base station, such as base station 105b, may trigger a conditional uplink transmission for a self-contained uplink slot and any neighboring downlink slots. Both of these processes should match, either by using a fixed mapping between a downlink transmission and a particular CUI-R location or resource, so base station 105b (the aggressor base station) knows when base station 105a (the victim base station) has set the CUI-R transmission corresponding to an uplink transmission that would overlap with the downlink transmission. In such case, base station 105a would signal the mapping to base station 105b, so that base station 105b can configure UE 115b (the aggressor UE) to monitor the right resources or locations for the CUI-R associated with a configured uplink transmission that overlaps with the scheduled downlink transmission.

It should be noted that in alternative aspects of the present disclosure, there may be multiple possible CUI-R resources or locations corresponding to each scheduled downlink transmission, and UE 115b (the aggressor UE) will stop the overlapping uplink transmissions when one of such CUI-R signals is detected.

Figure 8:
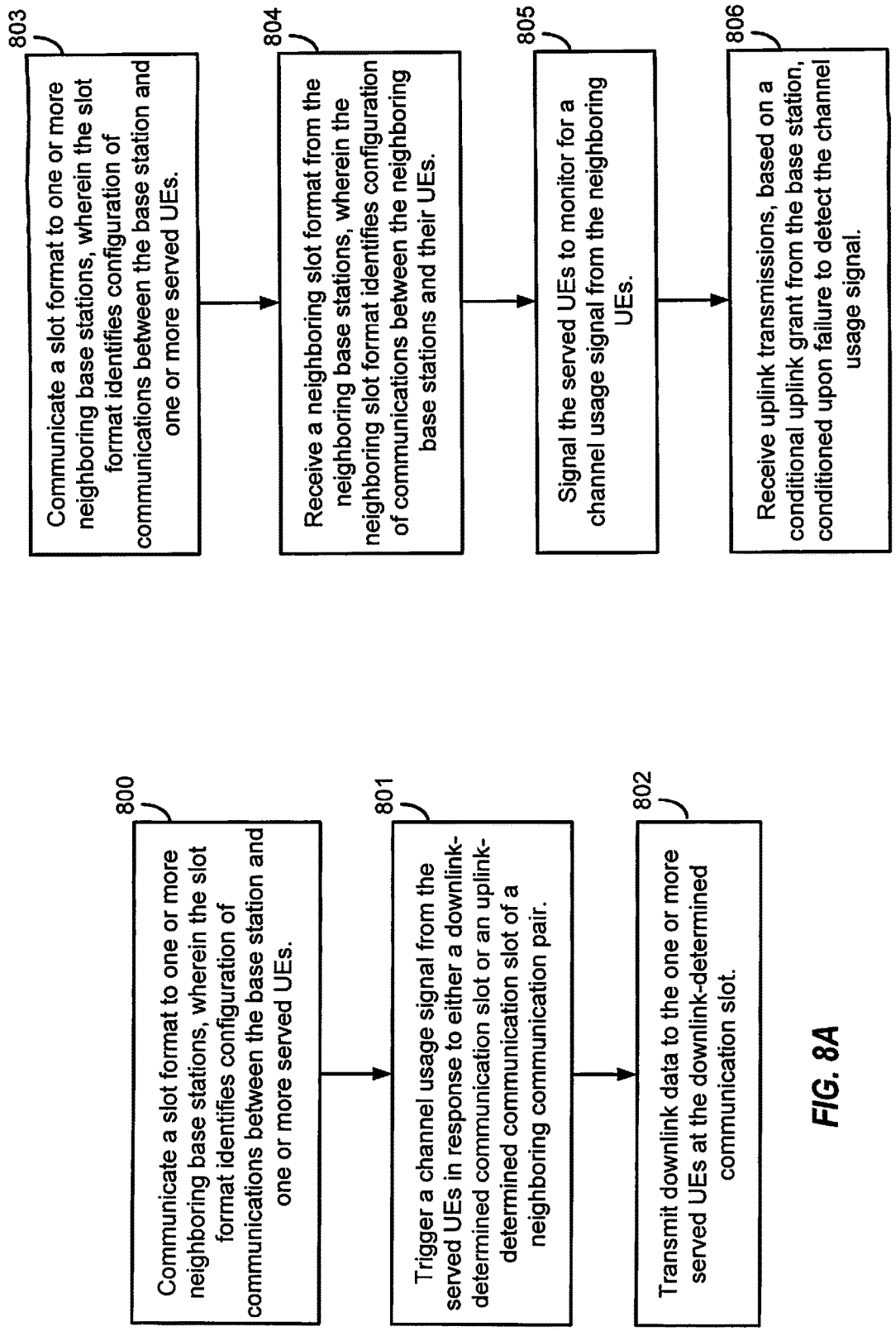
FIGS. 8A and 8B are block diagrams illustrating example blocks executed to implement one aspect of the present disclosure.
Figure 10:
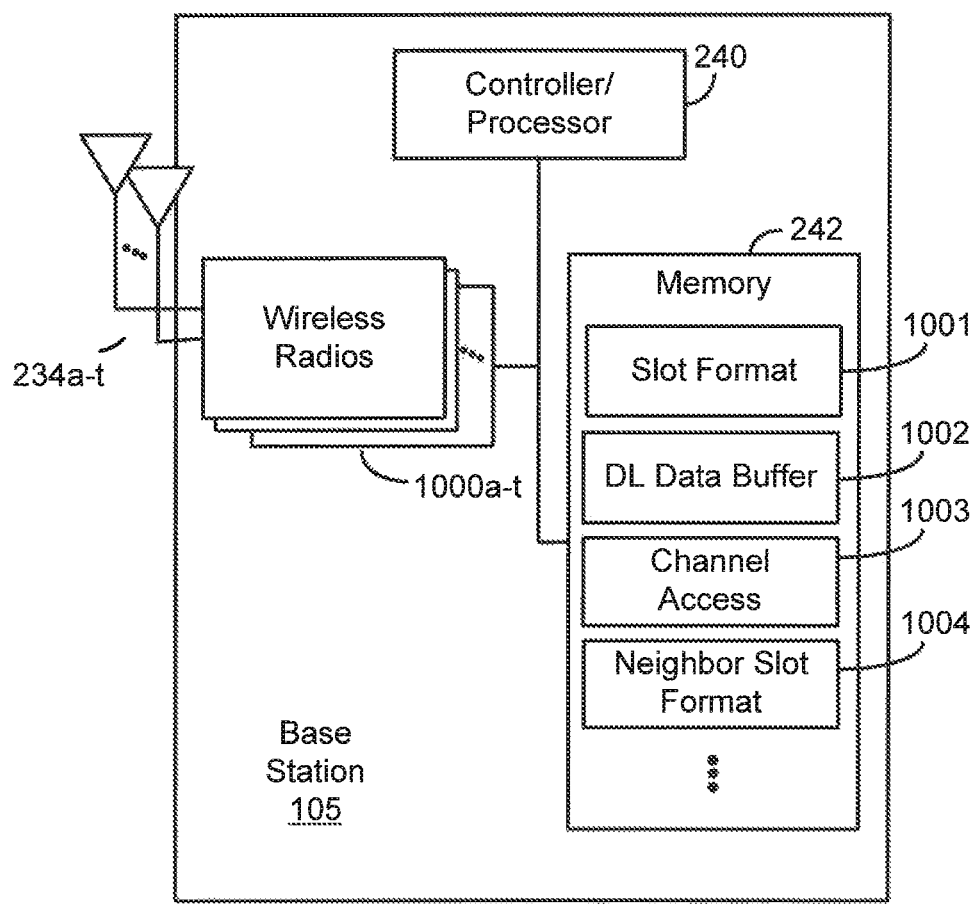
FIG. 10 is a block diagram illustrating an example base station configured according to aspects of the present disclosure.

FIG. 8A is a block diagram illustrating example blocks executed to implement one aspect of the present disclosure. The example blocks will also be described with respect to base station 105 as illustrated in FIG. 10. FIG. 10 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1000*a-t* and antennas 234*a-t*. Wireless radios 1000*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 800, a victim base station communicates a transmission format to one or more neighboring base stations, wherein the transmission format identifies configuration of communications between the base station and one or more served UEs. For example, under control of controller/processor 240, base station 105 communicates transmission format 1001, stored in memory 242, to the neighboring base stations via wireless radios 1000*a-t* and antennas 234*a-t*.

At block 801, the victim base station triggers a channel usage signal from the one or more served UEs in response to one of: a downlink-determined communication slot of a flexible-direction slot, or an uplink-determined communication of the one or more neighboring base stations of another flexible-direction slot. Base station 105 executes channel access logic 1003, under control of controller/processor 240. The execution environment of channel access logic 1003 allows base station 105, as a victim base station, to send out a signal triggering a served UE to transmit a channel usage signal. The trigger signal may be part of a downlink grant for transmitting data in downlink data buffer 1002 to the served UE or it may be a separate signal transmitted via wireless radios 1000*a-t* and antennas 234*a-t*.

At block 802, the victim base station transmits downlink data to the one or more served UEs at the downlink-determined communication slot. When data for the served UE exists in downlink data buffer 1002 in memory 242, base station 105 may then transmit the data to the served UE via wireless radios 1000*a-t* and antennas 234*a-t* according to the scheduling of the downlink grant.

FIG. 8B is a block diagram illustrating example blocks executed to implement one aspect of the present disclosure. The example blocks will also be described with respect to base station 105 as illustrated in FIG. 10. Base station 105, as illustrated in FIG. 10 may be a victim base station or an aggressor base station depending on the priority direction of the transmission period and the direction of the data to be communicated between base station 105 and its served UEs.

At block 803, an aggressor base station communicates a transmission format to one or more neighboring base stations, wherein the transmission format identifies configuration of communications between the base station and one or more served UEs. As with the victim base station, aggressor base station 105, under control of controller/processor 240, communicates transmission format 1001, stored in memory 242, to the neighboring base stations via wireless radios 1000*a-t* and antennas 234*a-t*.

At block 804, the aggressor base station receives a neighboring transmission format from the one or more neighboring base stations, wherein the neighboring transmission format identifies configuration of communications between the one or more neighboring base stations and one or more neighboring UEs. In cooperation with the neighboring base stations, base station 105 may also receive the transmission formats from each of the neighboring base stations via antennas 234*a-t* and wireless radios 1000*a-t*. Base station 105 will store the neighboring transmission formats at neighbor transmission format 1004, in memory 242.

At block 805, the aggressor base station signals the one or more served UEs to monitor for a channel usage signal from the one or more neighboring UEs during one of: an uplink-determined communication slot of a flexible-direction slot, or a downlink-determined communication slot communication of the one or more neighboring base stations of another flexible-direction slot. Base station 105, under control of controller/processor 240, executes channel access logic 1003, stored in memory 242. The execution environment of channel access logic 1003 determines access procedures for attempting to grant non-priority direction transmissions on the shared communication channel. In such instance, the aggressor base station of base station 105 signals its UEs schedule for uplink transmission to monitor for a CUI-R from one of the neighboring UEs. The signal, which may be a party of the conditional uplink grant or a separate signal specifically triggering the monitoring procedure, is transmitted via wireless radios 1000*a-t* and antennas 234*a-t*.

At block 806, the aggressor base station receives uplink transmissions from the one or more served UEs based on a conditional uplink grant from the base station conditioned upon failure to detect the channel usage signal. When the served UEs do not detect a CUI-R at the locations indicated for monitoring, the UEs will move forward with the uplink transmissions. Thus, if no CUI-R was detected by a served UE, base station 105 will begin receiving uplink transmissions via antennas 234*a-t* and wireless radios 1000*a-t* according to the uplink grant.

In summary, CUI-R may be transmitted in between control signals (e.g., PDCCH) and downlink/uplink data transmissions (e.g., PDSCH/PUSCH). Downlink data transmissions may also be delayed so that downlink and uplink transmissions may share the same slot timeline. When CUI-R signals are transmitted in the uplink control region, TDM/FDM multiplexing may be used with other uplink control data possibly, in which the CUI-R signal may use either SRS or PUCCH-type waveforms. A CUI-R detection scheduler may ensure that an aggressor UE has gap available for listening for the CUI-R signal. Signal dropping rules may be applied in case of signal collision between CUI-R transmission or monitoring with transmission of other periodic/a-periodic uplink control signals (e.g., PUCCH, SRS etc.). CUI-R transmission/detection may automatically be triggered by detection of either a downlink or uplink grant, as the case may be, when the UE is preconfigured in such a mode. Alternately, a control signal (e.g., DCI) may also contain bits to control CUI-R transmission/detection. The control signaling (e.g., DCI) for CUI-R detection/transmission may be decoupled from the data grant. The various aspects of the present disclosure may be applicable self-contained slot structures, as well as non-self-contained slot structures. Moreover, a unique timing relation is not required. The UE may be configured with multiple locations to monitor CUI-R or the victim UE may be configured to transmit CUI-R at various different locations or resources.

A single CUI-R also be used to gate multiple UL data transmissions within a configured time duration. A periodic CUI-R transmission may be semi-statically configured on victim side when interference expected and downlink data expected to be scheduled. In this case, where the CUI-R trigger is not part of the downlink grant but configured as a separate periodic transmission, the CUI-R signal may also be allowed before the PDCCH or downlink grant. Also a periodic CUI-R signal detection may be configured on the aggressor side when uplink data is expected to be scheduled on downlink priority transmission periods, and can use a CUI-R detection to gate conditional uplink grants for a configured duration. In such cases, semi-static or dynamic cooperation between neighboring base stations for coordination of communication would be beneficial.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A, 5B, 8A, and 8B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, at a user equipment (UE), a downlink grant from a serving base station, wherein the downlink grant identifies downlink transmission in one or more subsequent communication slots;
identifying, by the UE, a trigger for transmission of a channel usage signal associated with the downlink grant;
transmitting, by the UE, the channel usage signal in a next scheduled uplink region; and receiving, by the UE, downlink data from the serving base station according to the downlink grant, wherein the channel usage signal is transmitted between the receiving the downlink grant and the receiving the downlink data.

2. The method of claim 1, wherein the trigger is one of:
included within the downlink grant; or
included in a signal from the serving base station separate from the downlink grant.

3. The method of claim 1, wherein the trigger includes one of:
a single-bit trigger to transmit the channel usage signal at a predetermined timeline; or
an identifier for the UE to identify the predetermined timeline from a set of preconfigured channel usage timelines.

4. The method of claim 1, wherein a waveform of the channel usage signal includes one of:
a sounding reference signal (SRS) waveform; or
a physical uplink control channel (PUCCH) waveform.

5. The method of claim 1, further including:
transmitting, by the UE, scheduled uplink transmissions in the next scheduled uplink region, wherein the channel usage signal is multiplexed with the scheduled uplink transmission.

6. The method of claim 1, wherein the channel usage signal identifies channel occupancy for one or more of the one or more subsequent communication slots.

7. The method of claim 1, wherein the trigger triggers one of:
a plurality of channel usage signals transmitted at each uplink transmission opportunity over a predetermine time beginning with the next scheduled uplink region; or
the plurality of channel usage signals transmitted in one or more uplink transmission opportunities periodically over the predetermined time beginning with the next scheduled uplink region.

8. The method of claim 1, further including:
receiving, by the UE, the trigger in a control signal separate from the downlink grant, wherein the next scheduled uplink region is prior to the downlink grant.

9. The method of claim 1, wherein the next scheduled uplink region includes an uplink control region within a current slot in which the downlink grant is received.

10. A method of wireless communication, comprising:
receiving, at a user equipment (UE), a conditional uplink grant, wherein the conditional uplink grant identifies uplink transmissions for one or more subsequent uplink slots;
identifying, by the UE, a monitor configuration for detection of a channel usage signal from one or more neighboring UEs;
monitoring, by the UE in response to the monitor configuration, for the channel usage signal in a next scheduled uplink region;
transmitting, by the UE, uplink data according to the conditional uplink grant in response to a failure to detect the channel usage signal; and
refraining, by the UE, from transmission of the uplink data according to the conditional uplink grant in response to detection of the channel usage signal.

11. The method of claim 10, wherein the monitor configuration includes a trigger indicator having one of:
a trigger bit identifying one of: activation or deactivation, of the monitoring; or
a trigger identifier identifying a channel usage configuration of a plurality of channel usage configurations, wherein the channel usage configuration includes one or more sets of resources on which the channel usage signal may be transmitted.

12. The method of claim 10, further including:
switching, by the UE, from transmission to reception mode during the next scheduled uplink region in response to the monitor configuration; and
in response to the switching, one or both of:
refraining from scheduling any additional uplink transmissions in the next scheduled uplink region; and
dropping all scheduled additional uplink transmissions scheduled for the next scheduled uplink region.

13. The method of claim 10, wherein the monitor configuration includes one of:
a fixed timing for the channel usage signal; or
a timing indication identifying a set of resources within which the channel usage signal may be transmitted.

14. The method of claim 13, wherein the set of resources includes one of:
one or more identified symbols on all subsequent communication slots;
one or more identified symbols on a plurality of periodic slots; or
each opportunity during which the UE is not transmitting.

15. The method of claim 10, wherein the monitor configuration is one of:
included with the conditional uplink grant; or
received from the serving base station in a signal separate from the conditional uplink grant.

16. The method of claim 15,
wherein the monitor configuration is received from the serving base station in the separate signal; and
wherein the refraining from transmission of the uplink data is continued for a preconfigured time window.

17. The method of claim 16, further including:
receiving, by the UE, the preconfigured time window from the serving base station, wherein the preconfigured time window is received one of: dynamically or semi-statically.

18. The method of claim 15, further including:
determining, by the UE, a duration between receipt of the conditional uplink grant and a last detection of the channel usage signal in response to receipt of the monitor configuration, wherein the determining the duration is executed in response to the receiving the conditional uplink grant,
wherein, the refraining from transmission of the uplink data is further in response to the duration being less than or equal to a preconfigured duration, and
wherein, the transmitting the uplink data is further in response to receipt of the channel usage signal and the duration being greater than the preconfigured duration.

19. The method of claim 10, further including:
reporting, by the UE to the serving base station, location information associated with the channel usage signal when detected.

20. A method of wireless communication, comprising:
communicating, at a base station, a slot format to one or more neighboring base stations, wherein the slot format identifies configuration of communications between the base station and one or more served user equipments (UEs);
triggering, by the base station, a channel usage signal from the one or more served UEs in response to one of:
a downlink-determined communication slot of a flexible-direction slot, or an uplink-determined communication of the one or more neighboring base stations of another flexible-direction slot; and transmitting, by the base station, downlink data to the one or more served UEs at the downlink-determined communication slot.

21. The method of claim 20, wherein the communicating the slot format includes one of:

semi-statically transmitting the slot format, wherein the slot format includes an uplink-downlink configuration; or dynamically transmitting the slot format, wherein the slot format includes a slot-direction determination for one or more future slots within a scheduled communication period.

22. The method of claim 20, further including:

receiving, at the base station from at least one base station of the one or more neighboring base stations, uplink transmission scheduling information between the at least one base station and a neighboring UE served by the at least one base station;

identifying, by the base station, the downlink-determined communication slot overlaps with the uplink transmission scheduling information; and signaling, by the base station to the at least one base station, a mapping association between the channel usage signal and the downlink-determined communication slot.

23. The method of claim 20, wherein the triggering the channel usage signal includes:

identifying transmission resources of a plurality of transmission resources for the channel usage signal, wherein the transmission resources identified correspond to the downlink-determined communication slot.

24. A method of wireless communication, comprising:

communicating, at a base station, a slot format to one or more neighboring base stations, wherein the slot format identifies configuration of communication slots between the base station and one or more served user equipments (UEs);

receiving, at the base station, a neighboring slot format from the one or more neighboring base stations, wherein the neighboring slot format identifies configuration of communication slots between the one or more neighboring base stations and one or more neighboring UEs;

signaling, by the base station, the one or more served UEs to monitor for a channel usage signal from the one or more neighboring UEs during one of: an uplink-determined communication slot of a flexible-direction slot, or a downlink-determined communication slot of the one or more neighboring base stations of another flexible-direction slot; and receiving, by the base station, uplink transmissions from the one or more served UEs based on a conditional uplink grant from the base station conditioned upon failure to detect the channel usage signal.

25. The method of claim 24, wherein the communicating the slot format and receiving the neighboring slot format is conducted one of: semi-statically or dynamically.

26. The method of claim 25, wherein, for semi-statically conducting the communicating the slot format and the receiving the neighboring slot format, the slot format includes a synchronized common slot format for one or more of: downlink slots, uplink slots, and flexible slots for the base station and the one or more neighboring base stations over a predetermined cooperation period.

27. The method of 25, wherein, for dynamically conducting the communicating the slot format and the receiving the neighboring slot format, the communicating the slot format and the receiving the neighboring slot format occur at a frequency less than a predetermined number of next slots.

28. The method of claim 24, further including:

receiving, by the base station from a neighboring base station of the one or more neighboring base station, a mapping association between the channel usage signal and a downlink-determined communication slot;

identifying, by the base station based on the mapping association, a scheduled neighboring downlink overlapping with a scheduled uplink transmission of the one or more served UEs, wherein the signaling to monitor includes signaling the one or more UEs to monitor for the channel usage signal at a set of resources corresponding to channel usage signal resources for the scheduled neighboring downlink.

29. An apparatus configured for wireless communication, the apparatus comprising:

at least one processor; and a memory coupled to the at least one processor, wherein the at least one processor is configured to:

receive, at a user equipment (UE), a downlink grant from a serving base station, wherein the downlink grant identifies downlink transmission in one or more subsequent communication slots;

identify, by the UE, a trigger for transmission of a channel usage signal associated with the downlink grant;

transmit, by the UE, the channel usage signal in a next scheduled uplink region; and receive, by the UE, downlink data from the serving base station according to the downlink grant, wherein the channel usage signal is transmitted between the receiving the downlink grant and the receiving the downlink data.

30. The apparatus of claim 29, wherein the trigger is one of:

included within the downlink grant; or included in a signal from the serving base station separate from the downlink grant.

31. The apparatus of claim 29, wherein the trigger includes one of:

a single-bit trigger to transmit the channel usage signal at a predetermined timeline; or an identifier for the UE to identify the predetermined timeline from a set of preconfigured channel usage timelines.

32. The apparatus of claim 29, wherein a waveform of the channel usage signal includes one of:

a sounding reference signal (SRS) waveform; or a physical uplink control channel (PUCCH) waveform.

33. The apparatus of claim 29, further including configuration of the at least one processor to transmit, by the UE, scheduled uplink transmissions in the next scheduled uplink region, wherein the channel usage signal is multiplexed with the scheduled uplink transmission.

34. The apparatus of claim 29, wherein the channel usage signal identifies channel occupancy for one or more of the one or more subsequent communication slots.

35. The apparatus of claim 29, wherein the trigger triggers one of:

a plurality of channel usage signals transmitted at each uplink transmission opportunity over a predetermine time beginning with the next scheduled uplink region; or the plurality of channel usage signals transmitted in one or more uplink transmission opportunities periodically over the predetermined time beginning with the next scheduled uplink region.

36. The apparatus of claim 29, further including configuration of the at least one processor to receive, by the UE, the trigger in a control signal separate from the downlink grant, wherein the next scheduled uplink region is prior to the downlink grant.

37. The apparatus of claim 29, wherein the next scheduled uplink region includes an uplink control region within a current slot in which the downlink grant is received.

38. An apparatus configured for wireless communication, the apparatus comprising:
at least one processor; and
a memory coupled to the at least one processor,
wherein the at least one processor is configured to:
receive, at a user equipment (UE), a conditional uplink grant, wherein the conditional uplink grant identifies uplink transmissions for one or more subsequent uplink slots;
identify, by the UE, a monitor configuration for detection of a channel usage signal from one or more neighboring UEs;
monitor, by the UE in response to the monitor configuration, for the channel usage signal in a next scheduled uplink region;
transmit, by the UE, uplink data according to the conditional uplink grant in response to a failure to detect the channel usage signal; and
refrain, by the UE, from transmission of the uplink data according to the conditional uplink grant in response to detection of the channel usage signal.

39. The apparatus of claim 38, wherein the monitor configuration includes a trigger indicator having one of:
a trigger bit identifying one of: activation or deactivation, of the monitoring; or
a trigger identifier identifying a channel usage configuration of a plurality of channel usage configurations, wherein the channel usage configuration includes one or more sets of resources on which the channel usage signal may be transmitted.

40. The apparatus of claim 38, further including configuration of the at least one processor to:
switch, by the UE, from transmission to reception mode during the next scheduled uplinl region in response to the monitor configuration; and
in response to the switching, one or both of:
refrain from scheduling any additional uplink transmissions in the next scheduled uplink region; and
drop all scheduled additional uplink transmissions scheduled for the next scheduled uplink region.

41. The apparatus of claim 38, wherein the monitor configuration includes on( of:
a fixed timing for the channel usage signal; or
a timing indication identifying a set of resources within which the channel usage signal may be transmitted.

42. The apparatus of claim 41, wherein the set of resources includes one of:
one or more identified symbols on all subsequent communication slots;
one or more identified symbols on a plurality of periodic slots; or
each opportunity during which the UE is not transmitting.

43. The apparatus of claim 38, wherein the monitor configuration is one of:
included with the conditional uplink grant; or
received from the serving base station in a signal separate from the conditional uplink grant.

44. The apparatus of claim 43,
wherein the monitor configuration is received from the serving base station in the separate signal; and
wherein the configuration of the at least one processor to refrain from transmission of the uplink data includes configuration to continue refraining for a preconfigured time window.

45. The apparatus of claim 44, further including configuration of the at least one processor to receive, by the UE, the preconfigured time window from the serving base station, wherein the preconfigured time window is received one of: dynamically or semi- statically.

46. The apparatus of claim 43, further including configuration of the at least one processor to:
determine, by the UE, a duration between receipt of the conditional uplink grant and a last detection of the channel usage signal in response to receipt of the monitor configuration, wherein the determining the duration is executed in response to the receiving the conditional uplink grant,
wherein, the at least one processor is configured to refrain from transmission of the uplink data is further in response to the duration being less than or equal to a preconfigured duration, and
wherein, the at least one processor is configured to transmit the uplink data further in response to receipt of the channel usage signal and the duration being greater than the preconfigured duration.

47. The apparatus of claim 38, further including configuration of the at least one processor to report, by the UE to the serving base station, location information associated with the channel usage signal when detected.

48. An apparatus configured for wireless communication, the apparatus comprising:
at least one processor; and
a memory coupled to the at least one processor,
wherein the at least one processor is configured to:
communicate, at a base station, a slot format to one or more neighboring base stations, wherein the slot format identifies configuration of communications between the base station and one or more served user equipments (UEs);
trigger, by the base station, a channel usage signal from the one or more served UEs in response to one of: a downlink-determined communication slot of a flexible-direction slot, or an uplink-determined communication of the one or more neighboring base stations of another flexible-direction slot; and
transmit, by the base station, downlink data to the one or more served UEs at the downlink-determined communication slot.

49. The apparatus of claim 48, wherein the configuration of the at least one processor configured to communicate the slot format includes configuration to one of:
semi-statically transmit the slot format, wherein the slot format includes an uplink- downlink configuration; or
dynamically transmit the slot format, wherein the slot format includes a slot-direction determination for one or more future slots within a scheduled communication period.

50. The apparatus of claim 48, further including configuration of the at least one processor to:
receive, at the base station from at least one base station of the one or more neighboring base stations, uplink transmission scheduling information between the at least one base station and a neighboring UE served by the at least one base station;

identify, by the base station, the downlink-determined communication slot overlaps with the uplink transmission scheduling information; and signal, by the base station to the at least one base station, a mapping association between the channel usage signal and the downlink-determined communication slot.

51. The apparatus of claim 48, wherein the configuration of the at least one processor to trigger the channel usage signal further includes configuration to identify transmission resources of a plurality of transmission resources for the channel usage signal, wherein the transmission resources identified correspond to the downlink-determined communication slot.

52. An apparatus configured for wireless communication, the apparatus comprising:

at least one processor; and a memory coupled to the at least one processor, wherein the at least one processor is configured to:

communicate, at a base station, a slot format to one or more neighboring base stations, wherein the slot format identifies configuration of communication slots between the base station and one or more served user equipments (UEs);

receive, at the base station, a neighboring slot format from the one or more neighboring base stations, wherein the neighboring slot format identifies configuration of communication slots between the one or more neighboring base stations and one or more neighboring UEs;

signal, by the base station, the one or more served UEs to monitor for a channel usage signal from the one or more neighboring UEs during one of: an uplink-determined communication slot of a flexible-direction slot, or a downlink-determined communication slot of the one or more neighboring base stations of another flexible-direction slot; and receive, by the base station, uplink transmissions from the one or more served UEs based on a conditional uplink grant from the base station conditioned upon failure to detect the channel usage signal.

53. The apparatus of claim 52, wherein the at least one processor is configured to communicate the slot format and receive the neighboring slot format either semi-statically or dynamically.

54. The apparatus of claim 53, wherein, for the at least one processor configured to semi-statically communicate the slot format and receive the neighboring slot format, the slot format includes a synchronized common slot format for one or more of:

downlink slots, uplink slots, and flexible slots for the base station and the one or more neighboring base stations over a predetermined cooperation period.

55. The apparatus of 53, wherein the at least one processor is configured to dynamically communicate the slot format and receive the neighboring slot format at a frequency less than a predetermined number of next slots.

56. The apparatus of claim 52, further including configuration of the at least one processor to:

receive, by the base station from a neighboring base station of the one or more neighboring base station, a mapping association between the channel usage signal and a downlink-determined communication slot;

identify, by the base station based on the mapping association, a scheduled neighboring downlink overlapping with a scheduled uplink transmission of the one or more served UEs, wherein the configuration of the at least one processor to signal to monitor includes configuration to signal the one or more UEs to monitor for the channel usage signal at a set of resources corresponding to channel usage signal resources for the scheduled neighboring downlink.

\* \* \* \* \*